April 19, 1932.   H. F. SMITH   1,854,565
REFRIGERATING APPARATUS
Filed Aug. 30, 1930
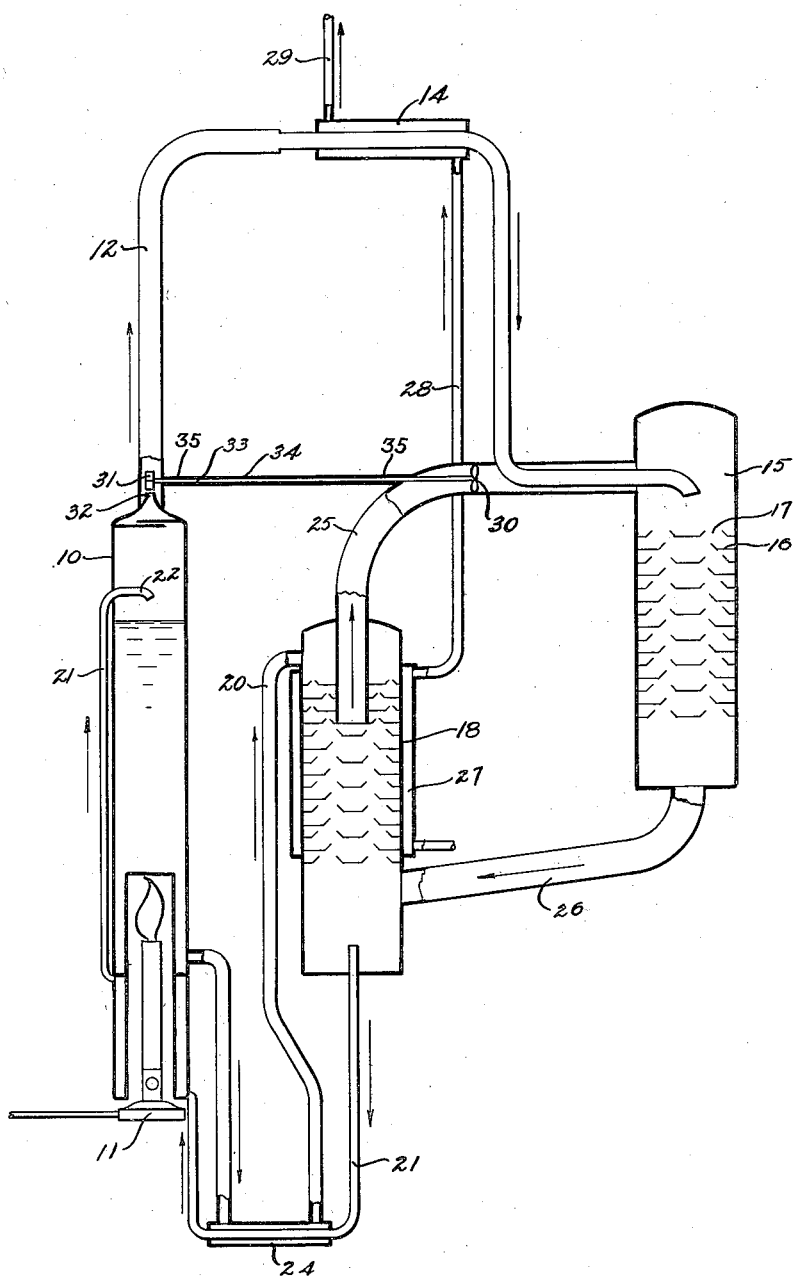
INVENTOR
Harry F. Smith
BY
Spencer, Hardman and John
ATTORNEYS Patented Apr. 19, 1932

1,854,565

UNITED STATES PATENT OFFICE

HARRY F. SMITH, OF DAYTON, OHIO, ASSIGNOR TO FRIGIDAIRE CORPORATION, OF DAYTON, OHIO, A CORPORATION OF DELAWARE

REFRIGERATING APPARATUS

Application filed August 30, 1930. Serial No. 478,983.

This invention relates to refrigerating apparatus and more particularly to refrigerating apparatus of the continuous partial pressure absorption type.

One of the objects of the invention is to provide an improved and simplified arrangement for circulating the inert gas in the system by forces generated within the system.

More specifically it is an object of the invention to provide a fan for circulating the inert gas in the system which is rotated by a turbine driven by gas expelled from the generator of the system.

Further objects and advantages of the present invention will be apparent from the following description, reference being had to the accompanying drawing, wherein a preferred form of the present invention is clearly shown.

In the drawing:

The figure is a diagrammatic illustration of a refrigerating system embodying the invention.

Absorption refrigerating systems of the partial pressure type have previously been proposed in which an inert gas is mixed with the refrigerant and circulated between the absorber and evaporator to equalize the total pressure existing throughout the system, an example of such an arrangement being shown in the patent to Geppert, Serial No. 662,690, filed November 27, 1900. In systems of this character it is necessary to make provision for circulating the inert gas between the absorber (wherein it is separated from the evaporated refrigerant) and the evaporator (wherein it adds its partial pressure to that of the refrigerant to produce the total pressure required to maintain the system substantially in equilibrium).

In the drawing, 10 designates any suitable generator which may be charged, for example, with aqua ammonia and heated by means of any suitable heating device such as a gas burner 11 to distill the ammonia from the solution. The distilled ammonia passes through a rectifier 12 wherein any aqua ammonia is separated and returned by gravity to the generator. The ammonia vapor then passes through a condenser 14 where it is condensed to a liquid which liquid then flows into the evaporator 15. The evaporator preferably consists of a number of shallow pans 16 having openings 17 in staggered relation. The liquid flows through the openings from one pan to the other until all of the pans are filled with a thin layer of liquid. Inert gas, such as hydrogen, air, or carbon dioxide is introduced into the system to equalize the total pressure between the high pressure required for distillation in the generator and the low ammonia pressure required for evaporation in the evaporator. The evaporator is connected both at its top and bottom with the top and bottom respectively of the absorber 18 by the ducts 25 and 26. The absorber 18 has an arrangement of pans similar to that of the evaporator. The top of the absorber is connected to the bottom of the generator by means of a conduit 20 which supplies weak liquor to the absorber for absorbing the evaporated refrigerant. The strong liquor resulting from the absorption of the refrigerant flows back to the generator by means of conduit 21 which surrounds the heater 11 and has its outlet 22 in the generator above the level of the liquid therein. The heater 11 and the upper portion of the conduit 21 form a vapor lift device for raising the strong liquid to the level of the generator. Preferably the conduits 20 and 21 form a heat exchanger 24 for pre-cooling the weak liquor as it flows from the hot generator to the cool absorber and pre-heating the strong liquor as it flows from the cool absorber to the hot generator.

The absorber 18 is cooled by a water jacket 27 which surrounds it and through which water is circulated. The cold water passes upwardly through the duct 28 to the condensor 14 from which it is discharged through the duct 29.

In operation the generator 10 is continuously heated and continuously supplies refrigerant vapor at a high refrigerant pressure to the condensor 14 which in turn supplies liquid refrigerant continuously to the evaporator 15. In the evaporator the refrigerant is under a total pressure substantially equal to the pressure of the generator due to the pressure of the inert gas, but the partial pressure of refrigerant in the evaporator is low so that evaporation readily takes place, and the vapor passing through conduit 26 is absorbed by the weak liquor in the absorber 18. Upon absorption of the refrigerant vapor, the inert gas is liberated and is returned to the evaporator through conduit 25.

It has been found that the refrigeration produced by the evaporator varies according to the rate of circulation of the inert gas through the absorber, evaporator and the conduits 25 and 26. The natural circulation of the inert gas through this circuit is insufficient to produce the desired amount of refrigeration. Hence, mechanical means, such as are shown by Geppert, Serial No. 662,690, filed November 27, 1900, have been suggested for circulating the inert gas. However such means are objectionable since they require an external source of power and since stuffing boxes are necessary to prevent the escape of fluid around the drive shaft. The present invention, described hereunder, circumvents these difficulties by using force generated within the system for positively circulating the inert gas. Since this means is entirely contained within the system no stuffing boxes are required.

According to the present invention a fan 30 is suitably located in the duct 25 for circulating the inert gas through the ducts 25, 26 the absorber 18 and the evaporator 15. This fan is driven by turbine wheel 31 which is positioned adjacent the nozzle outlet 32 at the top of the generator. Ammonia vapors, expelled from the generator 10, pass through the nozzle 32, thus acquiring velocity, which nozzle directs the ammonia vapors against the turbine wheel 31, thereby causing it to rotate. In the illustrative embodiment, the turbine wheel 31 is connected to the fan 30 by a shaft 33 which rotates within the sleeve 34 so that it is hermetically sealed within the system, thereby eliminating stuffing boxes which would otherwise be necessary. This sleeve 34 connects the rectifier 12 and the duct 25 and is provided with bearings 35 at either end to support the shaft 33 at either end and prevent the flow of gases therethrough. Since there is substantially no difference in pressure between the rectifier 12 and the duct 25, no stuffing boxes are necessary.

Since the fan 30 sets up a positive circulation of the inert gas, any desirable inert gas may be used irrespective of its density. Moreover this arrangement affords considerable latitude in the choice of the location of the evaporator with reference to the absorber. By driving the fan 30 by the turbine 31 which is rotated by refrigerant vapor continuously expelled from the generator, the need for an external mechanical source of power is obviated and since the turbine, shaft, and fan are hermetically sealed within the system, the use of stuffing boxes is obviated.

While the form of embodiment of the invention as herein disclosed, constitutes a preferred form, it is to be understood that other forms might be adopted, all coming within the scope of the claims which follow.

What is claimed is as follows:

1. Refrigerating apparatus including a first circuit including a generator having means to expel a fluid therefrom, a condenser, an absorber and an evaporator, and ducts for connecting these elements, a second fluid circuit including the absorber and evaporator and rotary means driven by fluid expelled from the generator for positively circulating a second fluid through said second circuit.

2. Refrigerating apparatus including a first circuit including a generator having means to expel a fluid therefrom, a condenser, an absorber and an evaporator, and ducts for connecting these elements, a second fluid circuit including the evaporator and absorber, and a turbine driven by fluid expelled from the generator for positively circulating a second fluid through the second circuit.

3. Refrigerating apparatus including a primary circuit including a generator having means to expel a fluid therefrom, a condenser, an absorber, and evaporator therein, and ducts connecting these elements, a second circuit including the absorber and evaporator having therein a gas inert with respect to the materials present in the apparatus, a turbine rotated by fluid expelled from the generator and a blower rotated by said turbine for positively circulating the inert gas through said second circuit.

In testimony whereof I hereto affix my signature.

HARRY F. SMITH.